(12) United States Patent
Burke et al.

(10) Patent No.: US 6,597,500 B1
(45) Date of Patent: Jul. 22, 2003

(54) ADHESIVE LABEL WITH GRID FOR MICROSCOPE SLIDE

(75) Inventors: Julian Burke, Polegate (GB); Nishith Patel, Brighton (GB)

(73) Assignee: Genetix Limited, Hampshire (GB)

( * ) Notice: Subject to any disclaimer, the term of this patent is extended or adjusted under 35 U.S.C. 154(b) by 332 days.

(21) Appl. No.: 09/717,070

(22) Filed: Nov. 22, 2000

(30) Foreign Application Priority Data

Nov. 22, 1999 (GB) .............................................. 9927590

(51) Int. Cl.[7] .............................................. G02B 21/01
(52) U.S. Cl. ....................... 359/397; 359/396
(58) Field of Search ................. 359/397, 398, 359/396; 382/133

(56) References Cited

U.S. PATENT DOCUMENTS

| 3,951,512 A | | 4/1976 | Tolles |
| 4,039,247 A | * | 8/1977 | Lawman et al. ............. 359/398 |
| 4,183,614 A | * | 1/1980 | Feldman ....................... 359/397 |
| 4,327,661 A | * | 5/1982 | Boeckel ....................... 118/52 |
| 4,447,140 A | * | 5/1984 | Campbell et al. ........... 359/396 |
| 5,349,436 A | | 9/1994 | Fisch |
| 5,415,060 A | | 5/1995 | DeStefano, Jr. |
| 5,512,343 A | | 4/1996 | Shaw |
| 5,784,193 A | * | 7/1998 | Ferguson .................... 359/398 |
| 5,807,522 A | | 9/1998 | Brown et al. |
| 5,812,692 A | * | 9/1998 | Rosenlof et al. ............ 382/133 |
| 5,866,241 A | * | 2/1999 | Xiang ........................ 428/210 |

FOREIGN PATENT DOCUMENTS

| DE | 37 38 982 | | 11/1988 |
| DE | 4209460 | | 9/1993 |
| DE | 199 52 139 | | 12/2000 |
| EP | 326349 | | 8/1989 |
| EP | 813086 | | 12/1997 |
| GB | 443934 | | 3/1936 |
| GB | 2125183 | | 2/1984 |
| GB | 2163866 | | 3/1986 |
| JP | 9203865 A | * | 8/1997 |
| JP | 9-203865 | | 9/1997 |
| WO | 99/12057 | | 3/1999 |
| WO | 01/31383 | | 5/2001 |

* cited by examiner

*Primary Examiner*—John R. Lee
*Assistant Examiner*—Johnnie L Smith, II
(74) *Attorney, Agent, or Firm*—Diederiks & Whitelaw, PLC

(57) ABSTRACT

An adhesive label 3 for attaching to a microscope slide 1 is disclosed. The label 3 may have one or more grids or arrays 2 provided on it to help an operator to manually spot a microscope slide 1.

5 Claims, 1 Drawing Sheet

ADHESIVE LABEL WITH GRID FOR MICROSCOPE SLIDE

The present invention relates to a microscope slide in combination with a self-adhesive label for use in manual microarraying.

Microarraying involves the transfer of e.g. biological DNA material from a source e.g. a microtitre plate to a target e.g. a glass microscope or microarray slide. Microtitre plates holding 96, 384 or 1534 different DNA samples are known, and conventionally it is desired to accurately transfer the samples from the source onto the target in the form of small distinct and separate micro spots. Once the material has been deposited in the form of micro spots the individual samples can then be analysed.

The accurate transfer of material from a source to a target can be achieved by either robotic or manual spotting. For robotic transfer the configuration of the material on the source can be easily monitored and controlled by setting the robotic system to spot in pre-defined areas and in a pre-defined configuration.

However, for manual transfer of material, the placement of the material from the source onto the target tends to be more difficult to monitor and control. The material being transferred is often clear and thus once it is dry it can be very difficult to know where a spot has already been placed and therefore exactly where the next spot should be placed on the target.

It is therefore desired to overcome the problems associated with conventional manual spotting techniques.

According to a first aspect of the present invention there is provided the combination of a microscope slide and an adhesive label as claimed in claim 1.

According to a second aspect of the present invention there is provided an adhesive label as claimed in claim 5.

According to a third aspect of the present invention there is provided a method of transferring DNA samples.

According to a fourth aspect of the present invention there is provided a method of spotting a microscope slide.

According to a preferred embodiment a pre-gridded microscope slide is provided which has a pre-printed alpha-numeric grid attached to the underside of the slide. The alpha-numeric grid appears through the glass slide with the numbers and letters in the correct configuration i.e. write read up.

Figure 1:
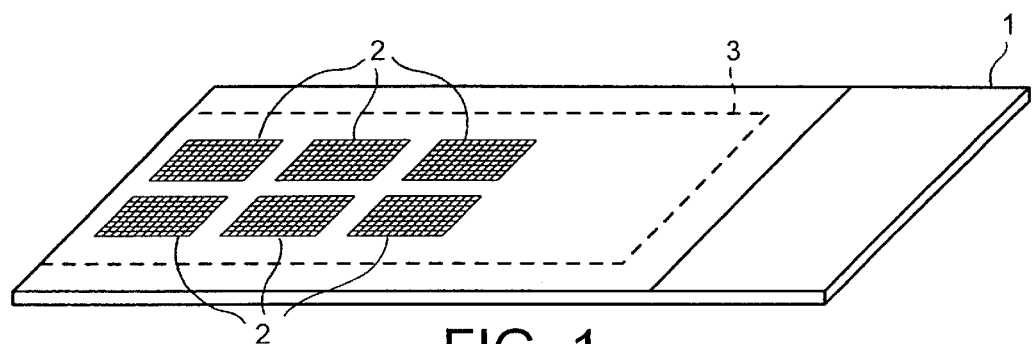

Various embodiments of the present invention will now be described, by way of example only, and with reference to the accompanying drawings in which:

FIG. 1 shows a microscope slide with a label attached thereto; and

Figure 2A:
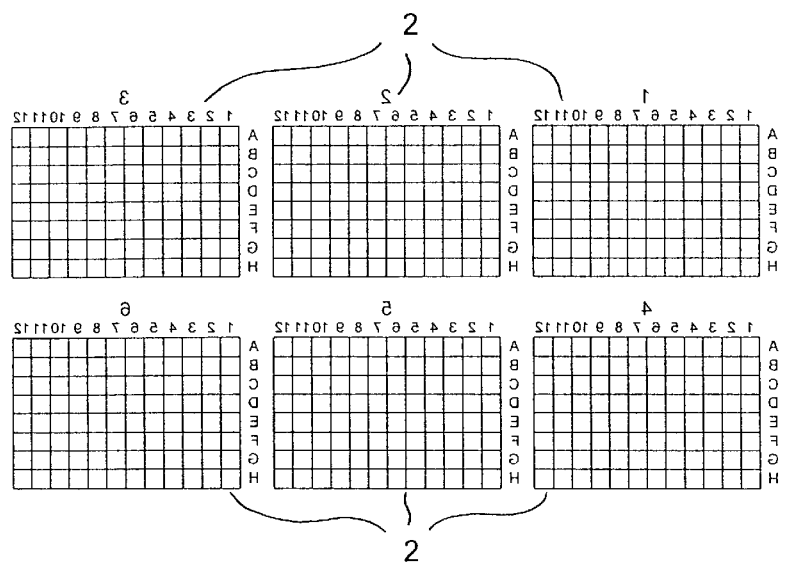
Figure 2B:
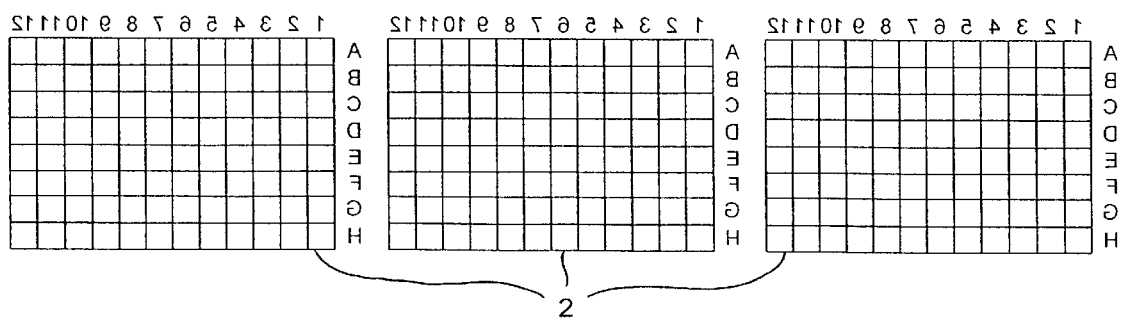

FIGS. 2(a) and 2(b) show two different labels.

With reference to FIG. 1, transfer of material onto a target microscope slide 1 is carried out from a source plate to pre-defined positions on the top surface of the glass slide 1, using a pre-printed grid 2, preferably printed on a label 3, as a guide for placement of material to be spotted. Knowing which box or cell of the grid 2 has previously been spotted enables a user to safely spot the next sample in the next available empty box or cell of the grid or array 2.

The format of the pre-printed grid 2 may vary, but a 8×12 array or grid corresponding with a 96 well microtitre plate format is preferred. According to such an embodiment, 96 different DNA samples can be transferred from the source microtitre plate to the target microscope slide 1 with a one to one correspondence between the two of them.

Two different embodiments of label design are shown in FIGS. 2(a) and 2(b). The labels are shown enlarged. In the embodiment shown in FIG. 2(a) each array 2 is approximately 6 mm×4 mm i.e. each cell is approximately 0.5 mm×0.5 mm. In the embodiment shown in FIG. 2(b) each array 2 is approximately 12 mm×8 mm i.e. each cell is approximately 1 mm×1 mm. The size and number of grids 2 on a single microscope slide 1 may vary depending on the amount of material that needs to be transferred. For the transfer of relatively large sample amounts, the grids 2 can be made correspondingly larger so that the individual cells of the grid 2 can hold sufficient material.

After spotting, the pre-gridded slides 1 can be used in further analysis stages which may require the slides 1 to withstand extreme temperatures. The pre-gridded slides 1 can preferably withstand repeated freezing, including temperatures down to −2° C. and repeated heating, up to 96° C. over prolonged periods of time. The slides 1 are also preferably resistant to corrosive chemicals and reagents.

The grids 2 have also been shown not to interfere with scanning of the glass slides 1 to detect fluorescent dyes, which is usually one of the final stages of spotted material analysis.

Preferably, the printed grids can be removed from the glass microscope/arraying slides 1, after transfer of material has occurred.

What is claimed is:

1. A microscope slide in combination with a self-adhesive label comprising:

a microscope slide having a front face upon which, in use, a sample to be analysed is deposited, and a rear face; and a label including indicia means comprising at least one alpha-numeric grid wherein, when said label is attached, in use, to the rear face of said microscope slide, said at least one alpha-numeric grid is visible when viewed through said front face of said microscope slide and wherein said at least one alpha-numeric grid comprises an 8×12 array.

2. The combination as claimed in claim 1, wherein characters forming said at least one alpha-numeric grid are printed as a mirror image of conventional alpha-numerics so that, when viewed in a mirror, numbers will appear as 0, 1, 2, 3 . . . n and characters will appear as A, B, C . . . Z.

3. An adhesive label for assisting the spotting of a microscope slide, said label having on one side an adhesive layer and on an opposed side a grid together with mirror images of alpha-numeric characters, wherein said grid comprises an 8×12 array.

4. A method of transferring DNA samples from a microtitre plate to a microscope slide, comprising the steps of:

providing a microtitre plate with a plurality of DNA samples arranged in an array of samples;

providing a microscope slide having front and rear faces;

attaching a pre-printed label having at least one alpha-numeric grid to the rear face of said microscope slide, said alpha-numeric grid comprising an 8×12 array; and transferring DNA material from said microtitre plate to the front face of said microscope slide using the grid on said label as a guide.

5. A method of manually spotting a microscope slide, comprising the steps of:

attaching an adhesive gridded indicia means comprising an alpha-numeric grid comprising an 8×12 array to an underside of said microscope slide; and spotting said microscope slide using said indicia means as a guide, with the indicia means being viewed through the microscope slide.

\* \* \* \* \*